United States Patent
Choksi

(10) Patent No.: US 7,359,715 B2
(45) Date of Patent: Apr. 15, 2008

(54) METHOD AND SYSTEM FOR DETECTING A PREFERRED WIRELESS NETWORK FOR A MOBILE DEVICE

(75) Inventor: Ojas T. Choksi, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/611,995

(22) Filed: Dec. 18, 2006

(65) Prior Publication Data

US 2007/0099632 A1    May 3, 2007

Related U.S. Application Data

(63) Continuation of application No. 09/839,832, filed on Apr. 19, 2001, now Pat. No. 7,171,216.

(51) Int. Cl.
*H04Q 7/20* (2006.01)

(52) U.S. Cl. ........... 455/456.1; 455/434; 455/456.6; 455/406; 455/456.3; 455/407; 455/422.1; 455/456.2; 379/114.01; 379/114.03; 379/125; 379/126; 379/121.04; 379/114.05

(58) Field of Classification Search ........... 455/456.1, 455/456.2, 456.3, 456.4, 456.5, 456.6, 457, 455/406, 407, 408, 405, 422.1, 403, 432.1, 455/434, 444, 445, 500, 517, 414.1, 414.2, 455/414.3, 435.1, 435.3, 550.1; 379/114.01, 379/114.03, 114.05, 114.26, 115.01, 115.09, 379/119, 121.04, 125, 126

See application file for complete search history.

(56) References Cited

U.S. PATENT DOCUMENTS

| | | | | |
|---|---|---|---|---|
| 5,613,199 | A | | 3/1997 | Yahagi ............... 455/426.1 |
| 5,907,802 | A | * | 5/1999 | Scott ................... 455/406 |
| 6,115,582 | A | | 9/2000 | Ishida ................ 340/7.42 |
| 6,115,608 | A | | 9/2000 | Duran et al. ......... 455/436 |
| 6,132,306 | A | | 10/2000 | Trompower ......... 453/11.1 |
| 6,167,268 | A | | 12/2000 | Souissi et al. ....... 455/434 |
| 6,243,577 | B1 | | 6/2001 | Elrefaie et al. ...... 455/426 |
| 6,246,875 | B1 | | 6/2001 | Seazholtz et al. .... 455/432.1 |
| 6,278,877 | B1 | | 8/2001 | Brederveld et al. .. 455/434 |
| 6,327,245 | B1 | | 12/2001 | Satyanarayana et al. .... 370/229 |
| 6,370,157 | B2 | | 4/2002 | Boccuzzi et al. .... 370/482 |
| 6,496,696 | B1 | | 12/2002 | Melnik ................ 455/446 |
| 6,529,491 | B1 | | 3/2003 | Chang et al. ........ 370/335 |
| 6,574,453 | B1 | | 6/2003 | Honda et al. ........ 455/11.1 |
| 2002/0102974 | A1 | | 8/2002 | Raith .................. 455/434 |
| 2005/0101333 | A1 | | 5/2005 | Raith .................. 455/456.1 |

* cited by examiner

*Primary Examiner*—Keith Ferguson
(74) *Attorney, Agent, or Firm*—Baker Botts L.L.P.

(57) ABSTRACT

A method and system for detecting a wireless network includes receiving at a mobile device a signal having data indicative of a location of the mobile device. A determination is made whether the mobile device is within the coverage area of a specified network based on the data. The mobile device scans for the specified network in response to at least determining that it is within the coverage area of the specified network.

21 Claims, 3 Drawing Sheets

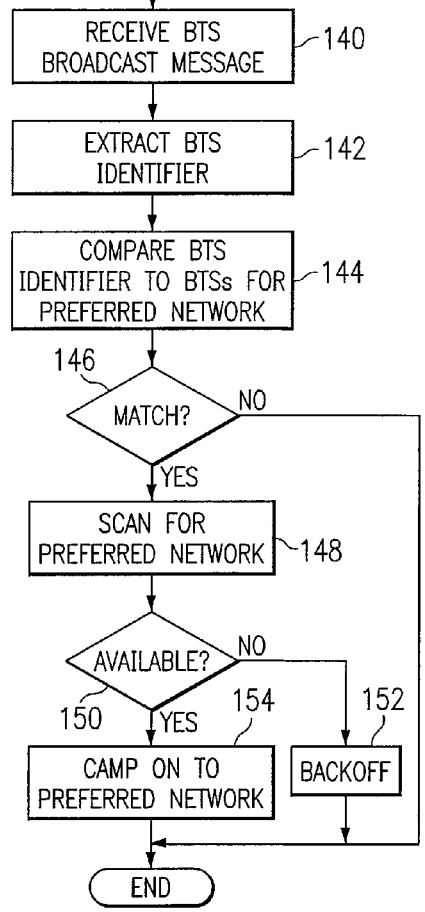
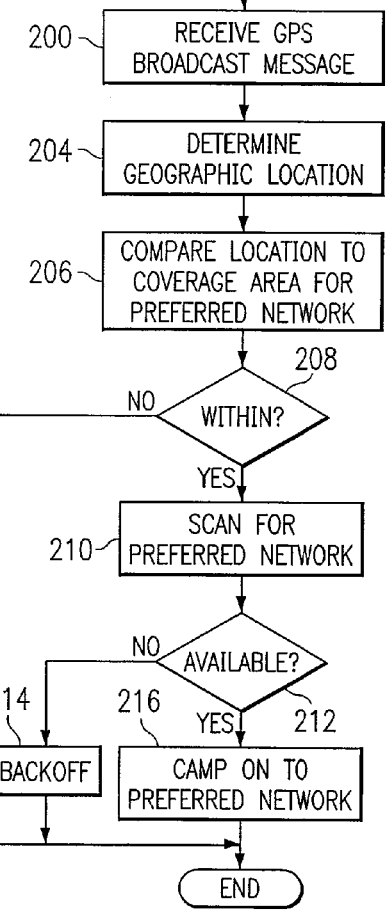
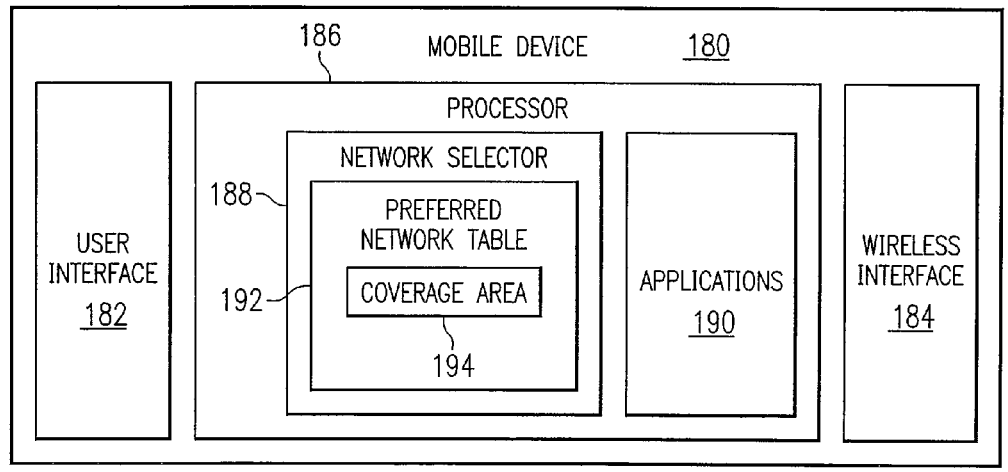

METHOD AND SYSTEM FOR DETECTING A PREFERRED WIRELESS NETWORK FOR A MOBILE DEVICE

CROSS-REFERENCE TO RELATED APPLICATION

This application is a continuation of U.S. application Ser. No. 09/839,832 filed Apr. 19, 2001 now U.S. Pat. No. 7,171,216 and entitled "Method and System for Detecting a Preferred Wireless Network for a Mobile Device".

TECHNICAL FIELD OF THE INVENTION

The present invention relates generally to the field of wireless communications, and more particularly to a method and system for detecting a preferred wireless network for a mobile device.

BACKGROUND OF THE INVENTION

Traditional wireless networks include a number of base stations (BTSs) in one or more mobile switching centers (MSCs). The BTSs each cover a geographic region, or cell of the wireless network and communicate with mobile telephones in the cell over a wireless link. The MSCs provide switch and soft handoff functionality for the wireless network. The wireless link may be based on established standards such as IS-54 (TDMA), IS-95 (CDMA), GMS and AMPS, 802.11 based WLAN, new upcoming standards such as CDMA 2000 and W-CDMA or proprietary radio interfaces.

Wireless networks include macro networks covering large geographic regions and smaller wireless campus networks covering a specific structure such as an office building or a set of related structures such as a corporate campus within a defined area. Campus networks often overlay one or more macro networks and provide corporate and other subscribers with preferential rate or services as compared to the macro network. Accordingly, a mobile device subscribing to the campus network will when activated camp onto the macro network only when the device is outside the coverage area of the campus network or otherwise unable to camp onto the campus network.

During operation, as the mobile device roams, it scans and selects networks based on signal strength. This ensures maximum call quality and allows for efficient handoff between cell sites and wireless networks. However, no accounting is made for network preference in areas of overlapping coverage.

SUMMARY OF THE INVENTION

The present invention provides a method and a system for detecting a preferred wireless network for a mobile device that substantially eliminates or reduces problems and disadvantages associated with the previous systems and methods. In particular, the mobile device determines when it is in and/or has entered the coverage area of a preferred network, scans for the network and camps onto the network if available.

In accordance with one embodiment of the present invention, a method and system for detecting a wireless network includes receiving at a mobile device a signal having data indicative of a location of the mobile device. A determination is made whether the mobile device is within the coverage area of a specified network based on the data. The mobile device scans for the specified network in response to at least determining that it is within the coverage area of the specified network.

More specifically, in accordance with a particular embodiment of the present invention, the signal is a base station broadcast message having one or more base station identifiers with geolocation information. In this embodiment, each base station identifier is extracted from the broadcast message and compared to a listing of base station identifiers for, in, or in the vicinity of the specified network. The mobile device scans for the specified network in response to at least one of the base station identifiers from the broadcast message matching one of the listed base station identifiers.

In accordance with another embodiment of the present invention, the signal is a global positioning satellite (GPS) signal. In this embodiment, a location of the mobile device is determined based on the GPS signal and compared to the coverage area of the specified network. The mobile device scans for the specified network in response to at least the mobile device being within the coverage area of the specified network.

Technical advantages of the present invention include providing a method and system for detecting a preferred wireless network for a mobile device. In a particular embodiment, the mobile device determines when it is in and/or has entered the coverage area of the preferred network and scans for the preferred network. If the preferred network is available, the mobile device camps onto the network. As a result, the mobile device maximizes utilization of the preferred network and its benefits.

Another technical advantage of one or more embodiments of the present invention includes providing a method and system for transparent network selection and mobility across preferred and overlying macro networks. In particular, mobile devices utilize location-based and/or location-indicative information to determine networks covering their location as they roam and select between the available networks. As a result, mobile devices will automatically detect and camp onto preferred networks when available.

Still another technical advantage of one or more embodiments of the present invention includes providing a method and system for detecting the coverage area of a preferred network by mobile devices. In particular, a mobile device utilizes broadcast overhead messages from the wireless network or available geographical location information to detect when it has entered the coverage area of a preferred network at which point the mobile device then initiates a scan for the preferred network. Accordingly, unnecessary scanning for the preferred network throughout a macro network is eliminated which reduces wireless traffic and maximizes battery life of the mobile device. In addition, changes to the macro network to support network selection and mobility are minimized.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 4 is a flow diagram illustrating a method for detecting a preferred wireless network for the mobile device of FIG. 3 in accordance with one embodiment of the present invention;

FIG. 5 is a block diagram illustrating the mobile device of FIG. 1 in accordance with another embodiment of the present invention; and FIG. 6 is a flow diagram illustrating a method for detecting a preferred network for the mobile device of FIG. 5 in accordance with one embodiment of the present invention.

DETAILED DESCRIPTION OF THE INVENTION

Figure 1:
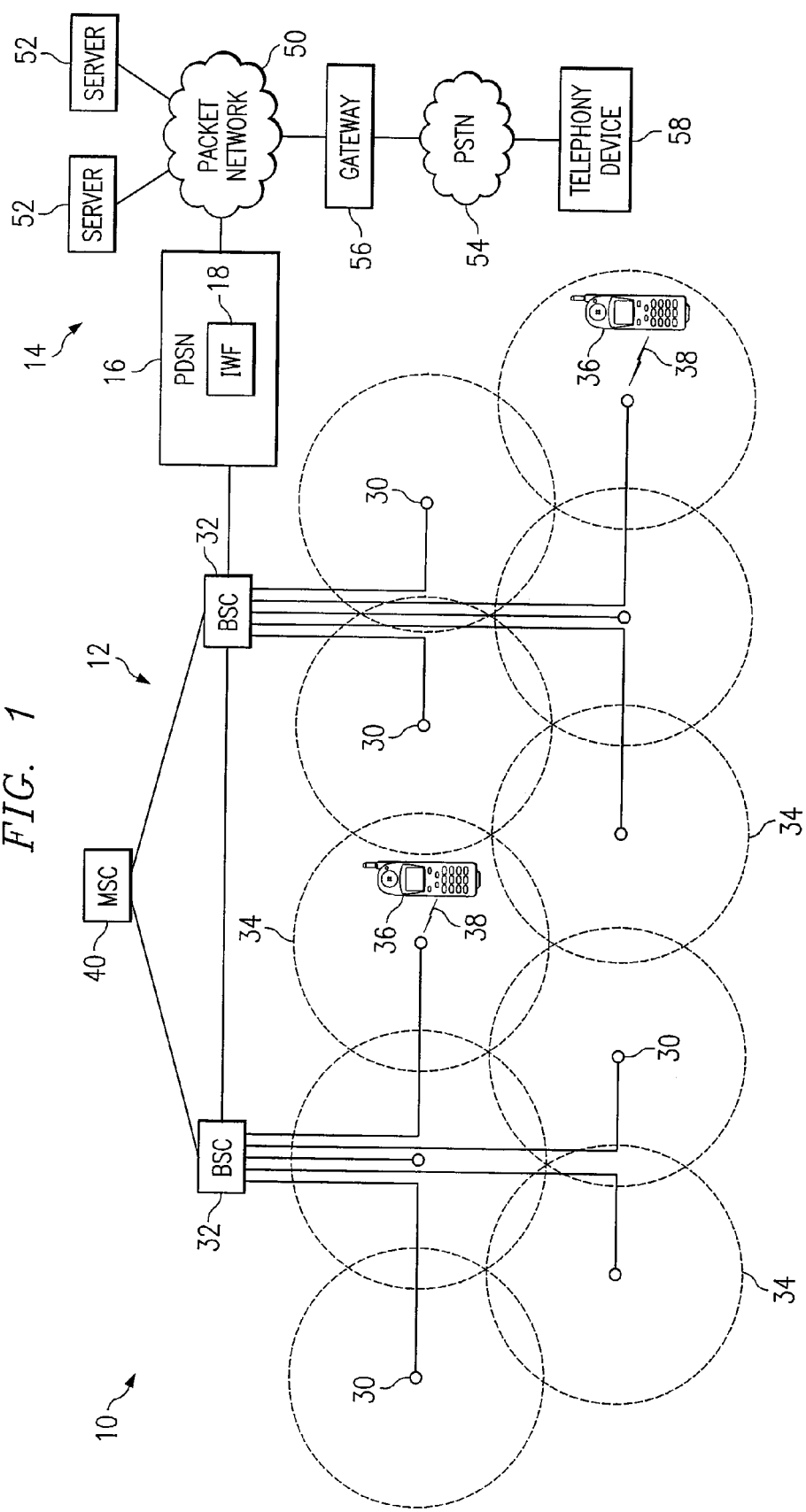
FIG. 1 is a block diagram illustrating a communications network in accordance with one embodiment of the present invention.

FIG. 1 illustrates a communications system 10 in accordance with one embodiment of the present invention. In this embodiment, the communications system 10 includes a cellular wireless network in which terrestrial wireless transmissions originate in geographically delimited cells. It will be understood that the present invention may be used in connection with other suitable wireless networks.

Referring to FIG. 1, the communications system 10 includes a wireless network 12 connected to a wireline network 14 through a packet data serving node (PDSN) 16. The PDSN 16 comprises a router that directs traffic between the wireless and wireline networks 12 and 14. In one embodiment, the PDSN 16 includes a data interworking function (IWF) 18 that provides connectivity between the wireless and wireline networks 12 and 14 via circuit switched and packet switched wireless data protocols. It will be understood that connectivity between the wireline and wireless networks 12 and 14 may be otherwise suitably provided without departing from the scope of the present invention.

The wireless network 12 includes a number of base stations (BTSs) 30 connected to base station controllers (BSCs) 32. The BTSs 30 each cover a geographic region, or cell 34 of the wireless network 12 and communicate with mobile devices 36 in the cell 34. The mobile devices 36 may be cell phones, data phones, portable data devices, portable computers, handheld devices, handsets, portable network appliances or other suitable devices capable of communicating information over a wireless link 38.

The BSCs 32 are connected to each other, to the PDSN 16 and to a mobile switching center (MSC) 40. The BSCs 32 and the MSC 40 provide switch and soft handoff functionality for the wireless network 12. In this way, voice, video, data and other information is routed to and from the mobile devices 36 and connections are maintained with the mobile devices 36 as they move throughout, or roam the wireless network 12.

Wireless link 38 is a radio frequency (RF) link. The wireless link 38 may be based on established technologies or standards such as IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The wireline network 14 includes a packet or other suitable data network 50 connecting a number of servers 52 to each other and to the PDSN 16. The packet network 50 also connects the PDSN 16, and thus the wireless network 12 to the public switched telephone network (PSTN) 54 through gateway 56. Accordingly, mobile devices 36 may communicate through wireless network 12, packet network 50 and PSTN 54 with standard telephones, clients and computers using modems or digital subscriber line (DSL) connections or other telephony devices 58.

The data network 50 may be the Internet, intranet, extranet, or other suitable local or wide area network capable of communicating information between remote endpoints. For the Internet embodiment, information is transmitted in Internet protocol (IP) packets using transport control protocol/Internet protocol (TCP/IP). It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS), domain name servers (DNS) and other suitable servers and functionality providing services to mobile devices 36 and/or to wireless and/or wireline connections in the communications system 10.

The servers 52 and/or other elements of the wireless or wireline networks 12 and 14 store subscriber level information for users of the wireless and/or wireline networks 12 and 14. The service level information includes service, quality and/or service level agreement (SLA) parameters for user connections as well as rate and other subscription information. In a particular embodiment, the BSCs 32 store or access SLA databases including a QoS policy and rate information for each user. The QoS identifies a class of service (CoS) for user connections, such as drops, delays, jitters and other limits for the user connections. It will be understood that subscription level information may be otherwise stored and/or accessed for call set up and mobility processing by the communications network 10.

Figure 2:
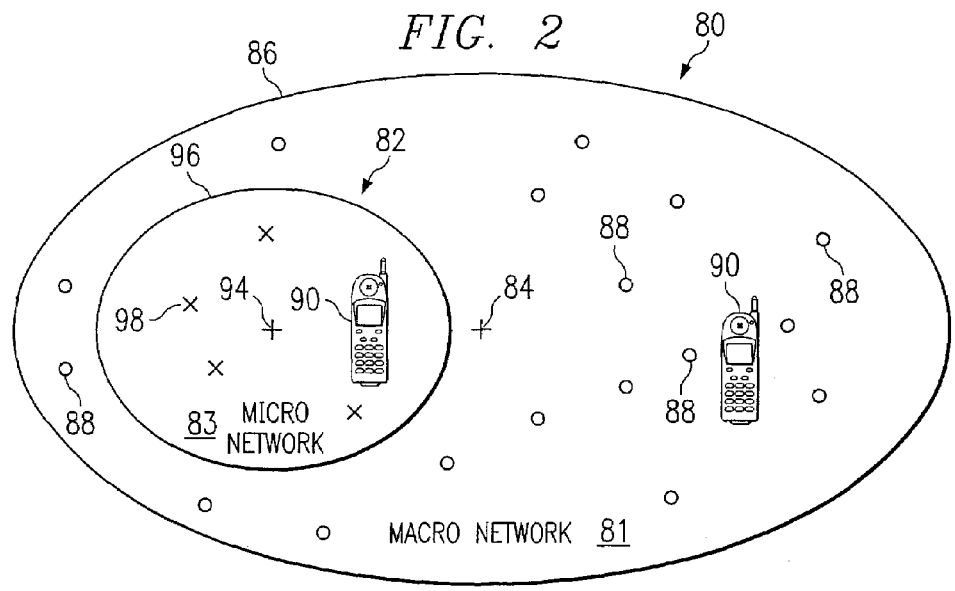
FIG. 2 is a block diagram illustrating a macro wireless network overlying a micro wireless network in accordance with one embodiment of the present invention.

FIG. 2 illustrates a plurality of overlapping wireless networks in accordance with one embodiment of the present invention. In this embodiment, a macro wireless network 80 covers a large geographic area 81 and overlays a micro network 82 covering a small geographic area 83, which may include a structure or a set of structures such as an office building, office park, travel port or corporate campus.

The macro network 80 includes a center 84 and a periphery 86 defining the shape and dimensions of the coverage area 81. Within the coverage area 81, the macro network 80 includes a plurality of evenly or otherwise suitably spaced BTSs 88 for communicating over a wireless link with mobile devices 90. As the mobile devices 90 move in, or traverse, in the macro network 80, calls are handed off between BTSs 88.

The micro network 82 includes a center 94 and a periphery 96 defining the shape and dimensions of the coverage area 83. Within the coverage area 83, the micro network 82 includes one or more evenly or otherwise suitably spaced base stations 98 for communication with mobile devices 90. In an office building, for example, each floor or other section of the building may include a BTS 98 or network of BTSs 98. As the mobile devices 90 move in, or traverse, the micro network 82, calls are handed off between BTSs 98.

The micro network 82 is a preferred network for subscribing mobile devices 90 in that the devices are programmed to camp onto the network 82 if available and otherwise to camp onto the overlying macro network 80. The micro network 82 may be preferred because it provides subscribers with reduced rates or enhanced services as compared to the macro or other overlapping network 80. For example, subscribers may receive guaranteed bandwidth, higher quality of service (QoS) and/or class of service (CoS) and/or be charged less for calls connected over preferred network 82. The calls may comprise video, voice, data, combinational and any other suitable type of information.

In operation, when a mobile device 90 is activated, it scans for available networks 80 and/or 82 and camps onto the preferred network 82 if available. Otherwise, the mobile device 90 camps onto the macro network 80. Thus, if the mobile device 90 is activated outside of the preferred network 82, it camps onto the macro network 80 and calls are connected through that network 80 and provided at the rates and service level agreed on for use of the network 80. When the mobile device 90 enters the preferred network 82, the mobile device 90 detects that it is within the coverage area 83 of the network 82, scans for the network 82 and camps onto the network 82 if available. The mobile device 90 may camp on independent of signal strength of the macro and/or preferred networks 80 and 82 or may require a minimal signal strength for decoding and/or other quality control. The mobile device 90 may continue to attempt to camp onto the preferred network 82 while within the coverage area 83 of the network 82. When the mobile device 90 leaves the coverage area 83 of the preferred network 82, it switches to the macro network 80 based on detecting that it is outside the coverage area of the preferred network 82, based on a decline of signal strength below a specified decoding threshold from the preferred network 82 or by other suitable methods.

As described in more detail below, the mobile device 90 uses data indicative of location of the mobile device 90 to determine its presence and/or entry into the coverage area 83 of the preferred network 82. The data comprises header, payload or other suitable bits, bytes or data words in a signal. This signal is a broadcast, multicast, unicast or other suitable signal. The data is indicative of the location of the mobile device 90 if it includes the location of the device, which may be an approximation, includes information from which the location of the device can be determined or includes information on the location of a disparate device known to be proximate to the mobile device 90, such as in a same or neighboring cell, by communication between the devices or other suitable means.

In one embodiment, the signal is a BTS broadcast message. In this embodiment, the data may comprise an identifier or the latitude and longitude of the BTS broadcasting the message. In another embodiment, the data may comprise one or more identifiers of neighboring BTSs and their associated radio technology with discovered by the broadcasting BTS using radio discovery. In still another embodiment, the signal comprises a global positioning satellite (GPS) signal. In this embodiment, the data comprises the information from which the location of the mobile device 90 can be determined. In these and other suitable embodiments, the presence and/or entry of the mobile device 90 into the coverage area 83 of the preferred network 82 is detected by matching the data or information based on the data to coverage data for the preferred network 82 corresponding in type to the data indicative of location. Thus, for example, a BTS identifier retrieved from a broadcast message may be compared to a listing of BTS identifiers of the macro network BTSs 88 in close proximity and/or overlaying to the coverage area 83 of the micro network 82 and/or BTS identifiers of the preferred network 82. The latitude and longitude of the BTS and/or mobile device 90 may alternatively be compared to the geographic coverage area of the preferred network 82.

Figure 3:
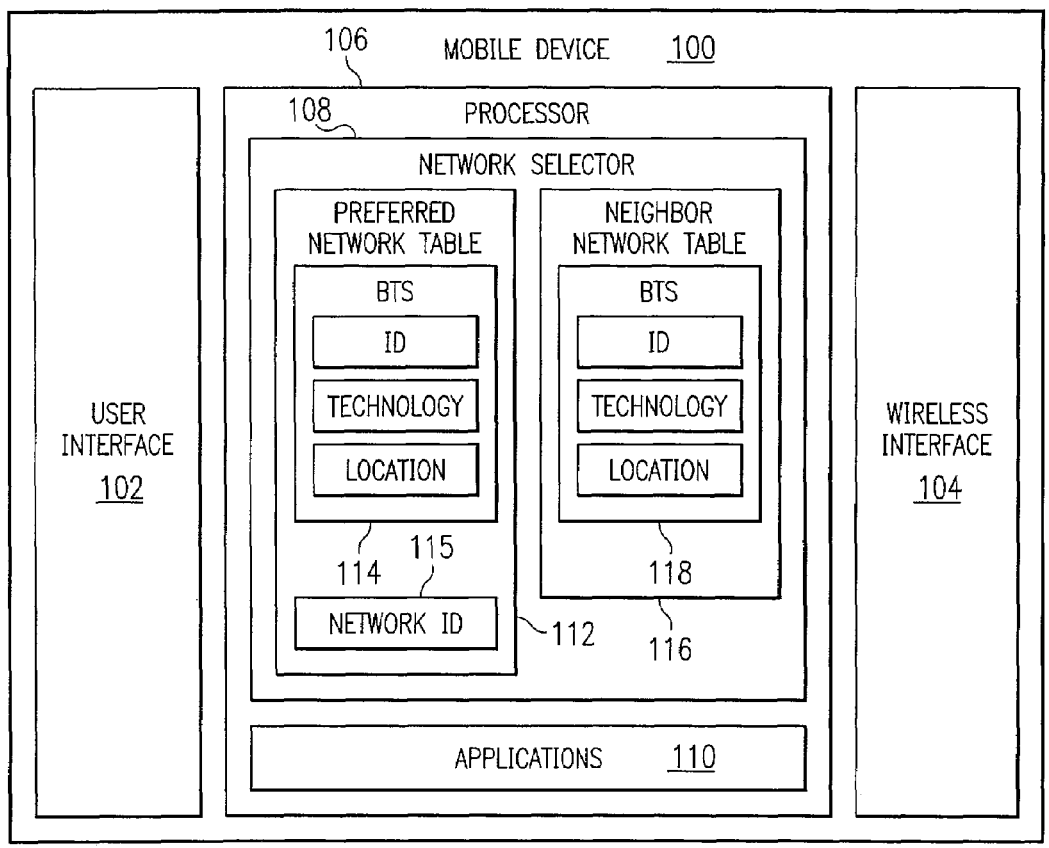
FIG. 3 is a block diagram illustrating the mobile device of FIG. 1 in accordance with one embodiment of the present invention.

FIG. 3 illustrates details of a mobile device 100 in accordance with one embodiment of the present invention. In this embodiment, mobile device 100 utilizes BTS identifiers to detect its presence and/or entry into the preferred network 82. The mobile device 100 is a multiple frequency handset capable of communicating data over a plurality of wireless networks. It will be understood that the mobile device 100 may be any suitable device capable of communicating with disparate networks.

Referring to FIG. 3, the mobile device 100 includes a user interface 102, a wireless interface 104, and a processor 106. The user interface 102 comprises keyboard, touch screen, tracking devices and/or microphones for receiving user input and video display and/or audio speaker for providing output to the user. It will be understood that the user interface 102 may comprise other or disparate input/output devices for communicating with the user and/or other suitable entity.

The wireless interface 104 comprises multiple or multi-frequency transceivers for transmitting and receiving information over wireless links. The wireless interface 104 may include queuing and control mechanisms for managing the transmission and reception of wireless traffic.

The processor 106 executes logic encoded in media for implementing the functionality of the mobile device 100. It will be understood that other components of the communication system 10 may also comprise logic encoded in media for implementing functionality of the device or system. The logic comprises functional instructions for carrying out the program task. The media comprises computer disks or other computer-readable media, application specific integrated circuits (ASIC), field programmable gate arrays (FPGA), digital signal processors (DSP), other suitable specific or general purpose processors, transmission media or other suitable media in which logic may be encoded and utilized.

In one embodiment, the processor 106 includes a network selector 108 and applications 110. The applications 110 may comprise telephony, video on demand, web browser applications and other suitable applications. The network selector 108 detects, scans for and camps onto an available network when the mobile device 100 is first activated and onto the preferred network 82 when the mobile device 100 is present or enters the coverage area 83 of the network 82.

The network selector 108 includes a preferred network table 112 comprising BTS identifiers 114 for all or other suitable sets of BTSs 98 in the preferred network 82. A neighboring network table 116 comprises BTS identifiers 118 for all or other suitable set of BTSs 88 whose coverage overlap and/or is proximate with that of the preferred network 82. In this embodiment, network selector 108 may determine if it is proximate to or within the coverage area 83 of the preferred network 82 based on identifiers of BTSs in the macro network 80 onto which the mobile device 100 is locked or identifiers of neighboring BTSs in the preferred network 82 discovered and transmitted by BTSs in the macro network 80 onto which the mobile device 100 is locked. The BTS identifiers 114 and 118 may comprise a BTS ID, a geolocation of the cell and/or a cell technology. The preferred network table 112 may also include a network ID 115 of the preferred network 82. In this embodiment, the network selector 108 may determine it is proximate to or within the coverage area 82 of the preferred network 82 based on the network ID 115 which is determined by the macro network 80 using radio discovery and broadcast by BTSs 88 of the macro network 80 neighboring the preferred network 82. A benefit to using geolocation alone or in conjunction with a corresponding technology to uniquely identify a BTS is that it is not typically subject to modification and accordingly need not be updated and/or refreshed. The preferred network and/or neighboring network tables 112 and 116 may comprise self-learning tables which are updated by the mobile device 100 based on broadcast messages received from the BTSs of the preferred network, which are themselves updated using radio discovery.

In one embodiment, radio discovery may be performed by BTSs sending out discovery messages when activated. In this embodiment, BTSs in the general area of an activated BTS and receiving the activation message respond with their identifiers. The activated BTS then determines which of the responding BTSs are neighboring BTSs based on interference, coverage area and/or proximity. The activated BTS then informs the neighboring BTSs of their status and the neighbor tables are updated in each of the affected BTSs. Neighboring networks may be similarly discovered during the radio discovery process.

As described in more detail below in connection with FIG. 4, the network selector 108 determines that the mobile device 100 is within the coverage area 83 of the preferred network 82 when it receives a BTS broadcast message including a BTS identifier matching one of the BTS identifiers 114 and/or 118 in the network tables 112 and/or 116. Accordingly, the mobile device 100 can detect that it is within the coverage area 83 of the preferred network 82 without using GPS signals and/or other mechanisms for determining the geographical location of the mobile device 100. In one embodiment, the mobile device 100 will attempt to camp on to the preferred network 82 as long as it can successfully decode the preferred network.

FIG. 4 illustrates a method for detecting a preferred network for a mobile device in accordance with one embodiment of the present invention. In this embodiment, BTS identifiers extracted from BTS broadcast messages are utilized to detect when the mobile device 100 is present in and/or has entered the coverage area 83 of the preferred network 82. It will be understood that other suitable information within the BTS broadcast message or other messages or signals transmitted within the wireless network and having data indicative of the location of the mobile device 100 may be used for detecting the preferred network 82.

The method begins at step 140 in which a BTS broadcast message for a CDMA or other suitable network is received by the mobile device 100. The mobile device 100 may receive and process the BTS broadcast messages when in the idle or other suitable state and/or states. Next, at step 142, a BTS identifier is extracted from the overhead of the broadcast message. At step 144, the BTS identifier is compared to the BTS identifiers 118 stored in the neighboring network table 116 of the mobile device 100. The ID technology and/or geolocation of the BTS identifier may be used in the comparison.

Proceeding to decisional step 146, if the BTS identifier 118 does not match those proximate to the preferred network 82, then the BTS whose coverage area the mobile device 100 has entered is not in or overlapping the coverage area 83 of the preferred network 82 and the No branch of decisional step 146 leads to the end of the process. In this case, the mobile device 100 remains camped onto macro network 80.

If the BTS identifier extracted from the broadcast message matches one of the identifiers 118 from the neighboring network table 116, the mobile device 100 is in close proximity to a cell of the preferred network 82 and thus near the coverage area 83 of the preferred network 82. Similarly, if a BTS identifier determined by the broadcasting BTS through radio discovery and transmitted with the broadcast message matches a BTS identifier 114 in the preferred network table 112, the mobile device 100 is in close proximity to a cell of the preferred network 82 and thus near the coverage area 83 of the preferred network 82. It will be understood that a valid determination that the mobile device 100 is within the coverage area 83 of the preferred network 82 may require more than one receipt of matching BTS identifiers to account for signal bounce and other transmission irregularities. Accordingly, the Yes branch of decisional step 146 leads to step 148.

At step 148, the mobile device 100 scans for the preferred network 82. Next, at decisional step 150, the mobile device 100 determines whether the preferred network 82 is available based on results of the scan. The preferred network may not be available due to weak coverage or due to a shut down for maintenance. If a preferred network 82 is not available, the No branch of decisional step 150 leads to step 152 where the mobile device 100 backs off and does not scan for a period of time to save power. The period of the backoff may increase for successive unsuccessful attempts to camp onto the micro network 82 and may be reset when the mobile device 100 moves out of proximity to the preferred network 82, such as when the mobile device 100 receives a broadcast message that does not include an identifier in the tables, or after a specified number of scans. Step 152 leads to the end of the process and the mobile device 100 remains camped onto the macro network 80.

At decisional step 150, if the preferred network 82 is available, the Yes branch of decisional step 150 leads to step 154 where the mobile device 100 camps onto the preferred network 82. Step 154 leads to the end of the process by which the mobile device 100 detects entry into the coverage area 83 of a preferred network 82, scans for the preferred network 82 and camps onto the preferred network 82 if available. Accordingly, use of the preferred network is maximized. In addition, use of the BTS broadcast messages allows the mobile device 100 to detect entry into the preferred network 82 without continuously scanning for the network which saves battery power and lengthens the operational life of the mobile device 100 between recharges.

FIG. 5 illustrates a mobile device 180 in accordance with another embodiment of the present invention. In this embodiment, the mobile device 180 utilizes global positioning satellite (GPS) information to detect its presence in and/or entry into the coverage area 83 of the preferred network 82. The mobile device 180 is a multiple frequency or other suitable handset capable of communicating data over a plurality of wireless networks.

Referring to FIG. 5, the mobile device 180 includes a user interface 182, a wireless interface 184 and a processor 186 as previously described in connection with the mobile device 100. The processor 186 includes a network selector 188 and applications 190 as also described in connection with the mobile device 100. The network selector 188 detects, scans for and camps onto an available network when the mobile device 180 is first activated and camps onto the preferred network 82 when the mobile device 180 is present or enters the coverage area 83 of the network 82.

The network selector 188 includes a preferred network table 192 comprising a definition 194 of the coverage area 83 of the preferred network 82. The coverage area 83 may be defined by a center, a size and a shape of the coverage area 83 or by multiple centers, sizes and shapes together forming the area. The center may be defined by a latitude and longitude while the size and shape are defined by the latitude and longitude of points along a periphery or by an equation giving the shape of the coverage area 83 about the center location. As described in more detail below in connection with FIG. 6, the network selector 188 determines that the mobile device 180 is within the coverage area 83 of the preferred network 82 when it receives a GPS signal indicating that the mobile device 180 is within the defined geographic area 94. Accordingly, the mobile device 180 can detect that it is within the coverage area 83 of the preferred network 82 without using network specific identifiers or network generated signals.

FIG. 6 illustrates a method for detecting a preferred network for a mobile device in accordance with one embodiment of the present invention. In this embodiment, GPS signals are utilized to detect when the mobile device 180 has entered the coverage area 83 of the preferred network 82. It will be understood that other suitable information from which the location of the mobile device 100 can be determined may be used for detecting the preferred network 82.

The method begins at step 200 in which a GPS broadcast message is received by the mobile device 180. The mobile device 180 may receive and process the GPS broadcast messages when in the idle or other suitable state and/or states. Next, at step 204, a location of the mobile device 180 is determined based on the GPS broadcast message. In determining its location, the mobile device 180 may utilize additional information and remote resources. At step 206, the location of the mobile device 180 is compared to the coverage area 83 for the preferred network 82 as defined in the preferred network table 192.

The defined coverage area 194 may exactly match or proximate the actual coverage area 83 of the preferred network 82. For example, the defined coverage area 194 may be slightly smaller than the actual coverage area 83 to simplify the geographical definition of the coverage area 83 and simplify the detection process. In this case, when the mobile device 180 is within the defined coverage area 194, it is inside the actual coverage area 83 and will successfully scan for the preferred network 82 and camp onto the micro network 82 if available. This eliminates unnecessary periodic scans. Thus, the coverage area used by the mobile devices 180 and 100 may be the actual, the area approximate, an estimated or other suitable coverage area.

Proceeding to decisional step 208, if the mobile device 180 is not within the defined coverage area 194 of the preferred network 82, the No branch of decisional step 208 leads to the end of the process. In this case, the mobile device 180 remains camped onto the macro network 80. If the mobile device 180 is within the defined coverage area 194 of the preferred network 82, the Yes branch leads to step 210. As previously described, a valid determination may require two or three successive or other suitable set of findings.

At step 210, the mobile device 180 scans for the preferred network 82. Next, at decisional step 212, the mobile device 180 determines whether the preferred network 82 is available based on results of the scan. If the preferred network 82 is not available, the No branch of decisional step 212 leads to step 214 where the mobile device 100 backs off and does not scan for a period of time to save power. As previously described in connection with FIG. 4, the period of the backoff may increase for successive unsuccessful attempts to camp on to the preferred network 82 and may be reset when the mobile device 100 moves out of proximity to the preferred network 82 or a specified number of tries. Step 214 leads to the end of the process and the mobile device 180 remains camped onto the macro network 80.

At decisional step 212, if the preferred network 82 is available, the Yes branch leads to step 216 where the mobile device 180 camps onto the preferred network 82. Step 216 leads to the end of the process by which the mobile device 180 detects entry into the coverage area 83 of the preferred network 82, scans for the preferred network 82, and camps onto the preferred network 82 if available. Accordingly, use of the preferred network is maximized without continuously scanning for the network.

In another embodiment, mobile device 180 may utilize latitude and longitude information transmitted in the BTS broadcast message to determine its approximate location and determine whether that location is within the coverage area of the preferred network 82. Accordingly, GPS information need not be used to determine the approximate location of the mobile device 180 and/or whether the mobile device 180 is within the coverage area of the preferred network 82.

Although the present invention has been described with several embodiments, various changes and modifications may be suggested to one skilled in the art. It is intended that the present invention encompass such changes and modifications as fall within the scope of the appended claims and their equivalents.

FIG. 3 illustrates feedback for rate control overflow extending over a wireless link in accordance with one embodiment of the present invention. In this embodiment, basic rate control is provided by TCP acknowledgment messages generated by a mobile device 36 at an end point of the flow and provide it back to the source of the flow. The source may be a server 52 or network device 54.

Referring to FIG. 3, a flow rate input 140 is initially set by source application based on parameters negotiated during connection setup. During the duration of the connection, the input flow rate is continually adjusted based on an inner power control 142, an outer power control 144, a packet level control level control 146 and a TCP flow control 148 to generate a flow rate output 150.

The inner power control 142 may comprise a signal power of the mobile device 36 terminating the flow or other direct indicator of power for the RF link to the mobile device 36. Typically, inner power control feedback is updated every 1-2 milliseconds.

The outer power control 144 comprises a link error rate and/or interference indicator for the wireless link. In one embodiment, the outer power control 144 utilizes a bit error rate to signal interference ratio for the wireless link. In this embodiment, feedback is typically provided every 50-100 milliseconds. Together, the inner and outer power control loops 142 and 144 provide feedback based on signal strength of the RF link.

The packet level control 146 may be provided the queuing system 82 in the air gateway 16. The packet level control 146 may be provided by other differential service treatment without departing from the scope of the present invention. Typically, packet level control feedback is updated every several hundred milliseconds.

The TCP flow control 148 provided through and alternate messages between the source and termination notes of each flow 90. As described above, TCP flow control may comprise acknowledgment messages fed back to the source and used by the source to adjust the transmission rate for the flow. The inner and outer power controls 142 and 144 may shape the acknowledgment messages to provide integrated traffic management and control.

FIG. 4 illustrates rate control for a flow across the communication system 10 in accordance with one embodiment of the present invention. In this embodiment, rate control is provided by shaped acknowledgment messages in connection with TCP.

Referring to FIG. 4, a source 180 transmits packets 182 across the transport network 50 to the air gateway 16. At the air gateway 16, the packets 182 are queued in a corresponding flow queue 186. From the flow queue 186, the packets are transmitted over an RF link 188 to a mobile end point device, or sink 190.

Response to successful receipt of a packet, the sink 190 generates acknowledgment messages 192 for feedback to the source 180. The acknowledgment messages 192 are forwarded to the air gateway 184 and queued in acknowledgment queue 194. Acknowledgment shaper 196 shapes acknowledgments 192 based on a power indicator from the RF link 188. The shaped acknowledgments 198 are fed back to the source 180 which adjusts transmission rate of the packets based on the shape of the acknowledgments. As used herein, the shape may be the overall timing between transmission of a packet and receipt of an acknowledgment. The relative timing between acknowledgment and/or set of acknowledgments and/or pacing of the acknowledgments.

FIG. 5 illustrates a gang flow control 200 for rate control for a flow across the communication system 10 in accordance with one embodiment of the present invention. In this embodiment, flows within each sector are ganged together for feedback control to effect offset traffic transmissions and thus, maximize bandwidth usage while minimizing interference.

Referring to FIG. 5, the gang flow control 200 includes an acknowledgment shaper 202 for each flow within a sector. As previously described in connection with the acknowledgment shaper 88, the acknowledgment shaper 202 may include an acknowledgment queue for receiving and temporarily storing acknowledgments generated by a termination mobile device. The acknowledgment shapers 202 receive power indicators for the wireless link of each flow and distribute acknowledgment transmissions across time to effect a substantially constant traffic flow for the sector.

In one embodiment, acknowledgments for each flow may be sent in groups to effect offsetting bursts for the traffic flows. In another embodiment, acknowledgments for each flow may be evenly distributed to effect a substantially steady flow rate for each flow.

FIG. 6 illustrates a method for integrated traffic management across communication system 10 in accordance with one embodiment of the present invention. In this embodiment, traffic is transmitted in a TCP flow across a wire line link of the packet network 50 and an RF link of the wireless network 12.

Referring to FIG. 6, the method begins at step 200 in which packets are transmitted from a source over the transport network 50. Next, at step 222, packets are converted to radio frames at the air gateway 16. As previously described, the packets may be converted into radio frames by the MAS 86.

Proceeding to step 224, the radio frames are communicated to the mobile device 36 over an RF link. At step 226, the packets are resembled at mobile device 36 from the radio frames. An acknowledgment message is generated in response to successful receipt of each packet.

Next, at step 230, the acknowledgment messages are communicated to the air gateway 16 over the RF link. The acknowledged messages may be stored in the acknowledged queues 112 of the acknowledged shapers 88.

Next, at step 232, conditions of the RF link are determined. As previously stated, conditions of the RF link may be determined based on the signal strength of the mobile device 36 error to interference ratios and other power indicators for the link. At step 234, transmission of the acknowledgments are shaped based on the RF link conditions. In one embodiment, transmission may be delayed to slow down the transmission rate or set of acknowledgments sent at once to increase and/or bursts the transmission rate. The acknowledgments may also be evenly distributed or otherwise simply paced to effect a substantially uniform transmission rate from the source.

Proceeding to decisional step 236, if additional traffic remains to be transmitted for the flow, the yes branch leads to step 238 in which the source adjusts its packet transmission rate based on the shaped acknowledgment messages received back over the communication system 10. Step 238 returns to step 220 in which packets continue to be transmitted over the network and the transmission rate adjusted based on accounting for the condition of the wireless link. At the end of traffic transmission for the flow, the no branch of decisional step 236 leads to the end of the process.

Though the present invention has been described in several embodiments, various changes and modifications may be suggested to one skilled in the art. It is intended that the present invention encompass such changes and modifications as falls within the scope of the appended claims and their equivalence.

What is clamed is:

1. A method for enlisting one or more end users in a network environment in which detection of a wireless serving node occurs, comprising:
   enlisting one or more end users in a billing plan associated with network communications;
   generating a bill associated with one or more of the end users, the bill being based on the billing plan; and
   facilitating network communications for one or more of the end users in response to the end users being enlisted in the billing plan, whereby the network communications includes a protocol that comprises:
      receiving at a mobile device a signal having data indicative of a location of the mobile device;
      determining whether the mobile device is within a coverage area of a specified network based on the data, wherein the specified network is overlapped by coverage from a macro network;
      scanning for the specified network in response to at least determining that the mobile device is within the coverage area of the specified network, wherein a decision as to whether to scan, by the mobile device, for the specified network is based on a distance between the location of the mobile device and a location of the specified network;
      determining if the specified network is available; and
      continuing to scan until the specified network is available or until the mobile device exits the macro network.

2. The method of claim 1, further comprising:
   Camping on the specified network if signals are received from the specified network at a minimal signal strength, even if other signals are received from the macro network at a signal strength greater than the signals received from the specified network.

3. The method of claim 1, wherein the signal comprises a base station broadcast message having a base station identifier, further comprising:
- extracting the base station identifier from the base station broadcast message;
- comparing the base station identifier to a listing of base station identifiers for base stations at least proximate to the specified network; and
- scanning for the specified network in response to at least the base station identifier from the base station broadcast message matching one of the base station identifiers in the listing of base station identifiers.

4. The method of claim 3, wherein the base station identifiers for the specified network are stored in a network table at the mobile device.

5. The method of claim 1, wherein the signal comprises a base station broadcast message having a latitude and longitude of the base station, further comprising:
- extracting the latitude and longitude from the base station broadcast message;
- comparing a location based on the latitude and longitude to the coverage area of the specified network; and
- scanning for the specified network in response to at least the location being within the coverage area of the specified network.

6. The method of claim 5, wherein the coverage area is defined at the mobile device.

7. The method of claim 6, wherein the coverage area is defined by at least a center, a shape and dimensional information for the coverage area.

8. The method of claim 1, wherein the signal comprises a global positioning satellite (GPS) signal, further comprising:
- determining a location of the mobile device based on the GPS signal;
- comparing the location of the mobile device to the coverage area of the specified network; and
- scanning for the specified network in response to at least the mobile device being within the coverage area of the specified network.

9. The method of claim 8, wherein the coverage area is defined at the mobile device.

10. The method of claim 9, wherein the coverage area is defined by at least a center, of the coverage area, a shape and dimensional information for the coverage area.

11. The method of claim 1, wherein the signal comprises a CDMA base station broadcast signal.

12. The method of claim 1, wherein the specified network comprises a preferred network for a user of the mobile device.

13. The method of claim 1, further comprising camping onto the specified network if available.

14. The method of claim 1, further comprising:
- determining whether the mobile device is within the coverage area of the specified network based on the data indicative of location and coverage data for the specified network corresponding in type to the data indicative of location.

15. The method of claim 1, further comprising:
- extending battery life of a battery in the mobile device by avoiding unnecessary scanning in a non-overlapping region provided by the macro network.

16. The method of claim 1, further comprising:
- minimizing camp time in the macro network in an overlay region of the macro network.

17. The method of claim 1, further comprising:
- providing a network selector element, a user interface, and a wireless interface in the mobile device.

18. The method of claim 1, further comprising:
- storing a preferred network table and a neighbor network table in the mobile device, wherein both of the tables include identification and location information.

19. The method of claim 1, further comprising:
- receiving discovery messages from one or more base transceiver stations.

20. The method of claim 19, wherein radio discovery is performed by base transceiver stations communicating discovery messages upon activation.

21. The method of claim 20, wherein the base transceiver stations respond to activation messages with their own identifiers, selected activated base transceiver stations determining which of the responding base transceiver stations are neighbors based on interference, coverage area, or proximity.

* * * * *